(12) United States Patent
Seetharaman et al.

(10) Patent No.: US 8,887,130 B2
(45) Date of Patent: Nov. 11, 2014

(54) SOFTWARE DESIGN AND DEVELOPMENT IN A SERVICE ORIENTED ENVIRONMENT

(75) Inventors: Arun Seetharaman, Los Angeles, CA (US); Douglas Saucier, Bainbridge Island, WA (US); Gary Lamperillo, Venice, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1324 days.

(21) Appl. No.: 11/820,295

(22) Filed: Jun. 18, 2007

(65) Prior Publication Data

US 2008/0282219 A1 Nov. 13, 2008

Related U.S. Application Data

(60) Provisional application No. 60/814,223, filed on Jun. 16, 2006.

(51) Int. Cl.
*G06F 9/44* (2006.01)

(52) U.S. Cl.
USPC .......................... 717/108; 717/116; 717/121

(58) Field of Classification Search
USPC .................. 717/106–109, 114–117, 120–122
See application file for complete search history.

(56) References Cited

U.S. PATENT DOCUMENTS

| | | | |
|---|---|---|---|
| 6,442,748 B1* | 8/2002 | Bowman-Amuah | 717/108 |
| 6,601,234 B1* | 7/2003 | Bowman-Amuah | 717/108 |
| 6,851,107 B1* | 2/2005 | Coad et al. | 717/108 |
| 6,986,120 B2* | 1/2006 | Reddy et al. | 717/104 |
| 7,197,740 B2* | 3/2007 | Beringer et al. | 717/108 |
| 7,287,037 B2* | 10/2007 | An et al. | 1/1 |
| 7,340,714 B2* | 3/2008 | Upton | 717/102 |
| 7,346,888 B1* | 3/2008 | Srinivasan et al. | 717/105 |
| 7,424,485 B2* | 9/2008 | Kristiansen et al. | 1/1 |
| 7,574,692 B2* | 8/2009 | Herscu | 717/116 |
| 7,581,205 B1* | 8/2009 | Massoudi | 717/106 |
| 7,647,298 B2* | 1/2010 | Adya et al. | 707/999.002 |
| 7,742,903 B2* | 6/2010 | Ciolfi et al. | 703/6 |
| 7,810,102 B2* | 10/2010 | Brendle et al. | 719/320 |
| 7,849,459 B2* | 12/2010 | Burkhart et al. | 717/174 |
| 7,853,961 B2* | 12/2010 | Nori et al. | 719/328 |
| 7,895,563 B2* | 2/2011 | Carlson et al. | 717/102 |
| 7,900,189 B2* | 3/2011 | O'Brien | 717/106 |
| 7,926,029 B1* | 4/2011 | Stoyen et al. | 717/117 |
| 7,926,030 B1* | 4/2011 | Harmon | 717/121 |

(Continued)

OTHER PUBLICATIONS

Burg et al, "A Self-Adaptive Deployment Framework for Service-Oriented Systems", ACM, pp. 208-217, 2011.*

Dinh et al, "A conceptual framework for designing service-oriented inter-organizational information systems", ACM, pp. 147-154, 2010.*

(Continued)

*Primary Examiner* — Anil Khatri

(74) *Attorney, Agent, or Firm* — Mark D. Wieczorek; Mayer & Williams PC

(57) ABSTRACT

The system and method provide for software design and development that result in applications that are service-oriented. The systems provide for architecture development, integration, and maintenance using an SOA approach, and in particular an approach that provides for service-oriented development of applications (SODA). Such systems include numerous beneficial and advantageous features, including ways to define requirements and ways to design and develop applications.

4 Claims, 12 Drawing Sheets

(56) References Cited

U.S. PATENT DOCUMENTS

| | | | |
|---|---|---|---|
| 7,954,083 B2* | 5/2011 | Berenbach et al. | 717/105 |
| 7,958,494 B2* | 6/2011 | Chaar et al. | 717/121 |
| 8,001,521 B2* | 8/2011 | Aakolk et al. | 717/106 |
| 8,051,404 B2* | 11/2011 | McGovern et al. | 717/109 |
| 8,099,716 B2* | 1/2012 | Tucker et al. | 717/121 |
| 8,151,242 B1* | 4/2012 | Takayanagi et al. | 717/104 |
| 8,176,083 B2* | 5/2012 | Vossen et al. | 707/796 |
| 8,312,426 B2* | 11/2012 | Bouillet et al. | 717/109 |
| 8,473,896 B2* | 6/2013 | Brunswig et al. | 717/104 |
| 8,631,387 B2* | 1/2014 | Henderson | 717/108 |

OTHER PUBLICATIONS

Zhang et al, "Service-Oriented-Architecture based Framework for Multi-User Virtual Environments", IEEE, pp. 1139-1147, 2008.*

Torkashvan et al, "A Service Oriented Framework for Cloud Computing", ACM, pp. 1-6, 2012.*

Guy Smith et al., "Java on Wall Street, Evolving the J2EE Presentation Layer", 23 pages, 2003. www.lighthouse-partners.com/javaonwallstreet/2003_presentation/Patrick_Smith_andGuy_Smith.ppt.

* cited by examiner

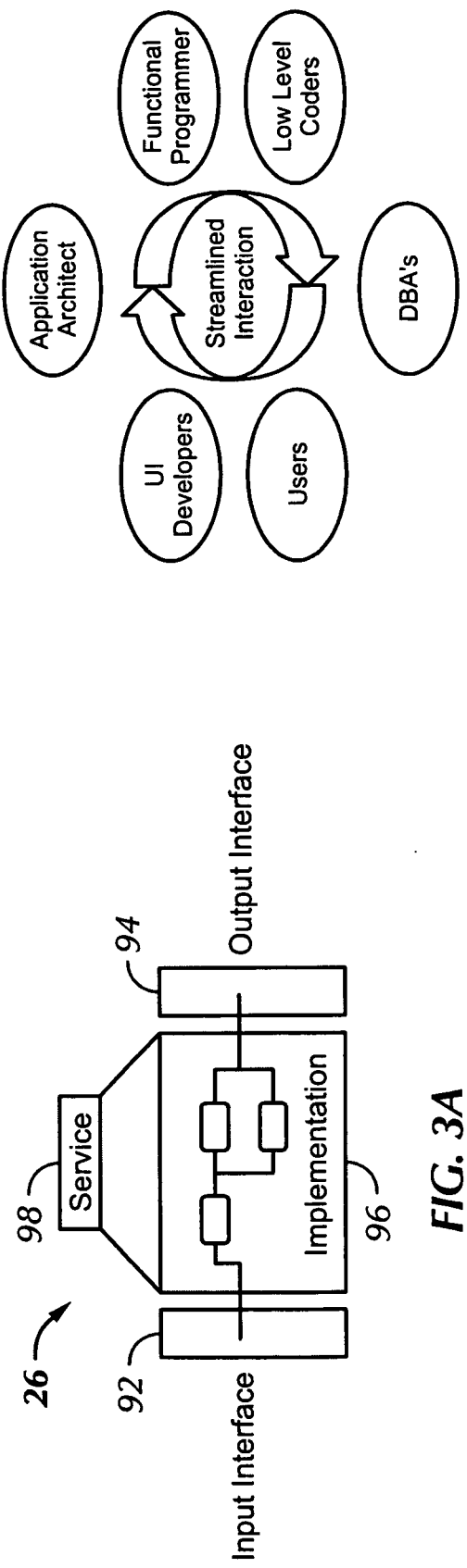
FIG. 3A
FIG. 3B
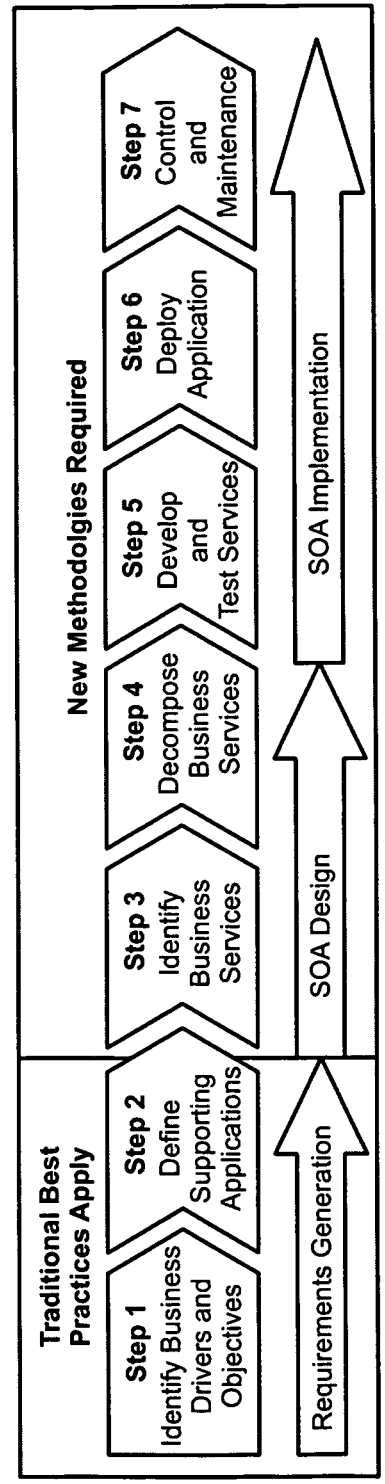
FIG. 3C

SOFTWARE DESIGN AND DEVELOPMENT IN A SERVICE ORIENTED ENVIRONMENT

CROSS-REFERENCE TO RELATED APPLICATIONS

This application claims benefit of priority of U.S. Provisional Patent Application Ser. No. 60/814,223, filed Jun. 16, 2006, entitled "Service Oriented Application Development and Support", which is incorporated by reference herein in its entirety.

FIELD OF THE INVENTION

The present invention relates to software applications, and more particularly to systems and methods to develop and support software applications.

BACKGROUND

In a conventional enterprise, application development often occurs on a project-by-project basis. As a result, each project may use a different approach and thus it may be that effort and resources are unintentionally duplicated. Similarly, the resulting approaches for integration and maintenance are often different and not coordinated.

Such difficulties persist even when open standard platforms such as Java are employed. Despite the defined specifications inherent in such platforms, different application development groups employ different architectures, internal communication mechanisms, and so on. To provide a degree of service-oriented architecture (SOA), as is often desired, it becomes necessary to write significant code to adapt one application to another.

SUMMARY

Embodiments of the systems and methods (collectively "systems") according to the invention provide for software design and development that result in applications that are, from their inception, service-oriented. The systems provide for architecture development, integration, and maintenance using an SOA approach, and in particular an approach that provides for service-oriented development of applications (SODA). Such systems include numerous beneficial and advantageous features, including ways to define requirements and ways to design and develop applications. Other features include interlayer communication schemes that provide for convenient design of service-oriented applications.

In one aspect, the invention is directed towards a method of producing a service-oriented application. The first step is performing requirements-gathering, including: developing an initial set of requirements for a service-oriented application; developing a list of use cases for the service-oriented application; developing a process model for the service-oriented application; reconciling the initial set of requirements with the process model; developing a detailed set of requirements for a service-oriented application; developing a set of use cases for the service-oriented application, the set associated with the list; developing a set of business rules for the service-oriented application; reconciling the detailed set of requirements with the set of use cases and the business rules; and developing a logical domain model for the service-oriented application. The second step is performing application design, including: developing at least one system use case associated with each one of the set of use cases; for each of the set of use cases, developing a use case realization; designing a user interface; defining an architecture for the service-oriented application, defining and designing application services for the service-oriented application, and defining a technical architecture for the service-oriented application; using the logical domain model, designing a logical data model; defining test cases; and reconciling the designed application services, the user interface, and the technical architecture with the second set of requirements and the defined test cases. The third step is performing application development, including: developing a page flow for the service-oriented application; developing at least one form. and at least one display for entering and displaying data, respectively; creating transfer objects; developing business rules and business objects; creating a physical data model from the logical data model; creating a set of database objects and domain objects; developing a set of data accessor and mappers; and integrating a layer containing the page flow, form, display, and transfer objects with a layer containing the business objects and rules with a layer containing the physical data model, the database and domain objects, and the data accessor and mappers.

Implementations of the invention may include one or more of the following. The method may further include developing a data dictionary and/or a glossary. The method may further include developing a service façade. The step of developing at least one form. and at least one display for entering and displaying data may include developing at least one FormBean and one ViewBean, respectively.

In a further aspect, the invention is directed towards a method of performing requirements-gathering, including: developing an initial set of requirements for a service-oriented application; developing a list of use cases for the service-oriented application; developing a process model for the service-oriented application; reconciling the initial set of requirements with the process model; developing a detailed set of requirements for a service-oriented application; developing a set of use cases for the service-oriented application, the set associated with the list; developing a set of business rules for the service-oriented application; reconciling the detailed set of requirements with the set of use cases and the business rules; and developing a logical domain model for the service-oriented application.

In another aspect, the invention is directed towards a method of performing a requirements-gathering phase in a service-oriented development of applications, including: developing a set of requirements for a service-oriented application; developing a list of use cases and a set of use cases for the service-oriented application; developing a process model for the service-oriented application; reconciling the set of requirements with the process model; developing a set of business rules for the service-oriented application; reconciling the set of requirements with the set of use cases and the business rules; and developing a logical domain model for the service-oriented application.

In another aspect, the invention is directed towards a method of performing application design for a service-oriented application in which a logical domain model and a set of requirements has been defined, including: developing at least one system use case associated with each one of a set of use cases; for each of the set of use cases, developing a use case realization; designing a user interface; defining an architecture for the service-oriented application, defining and designing application services for the service-oriented application, and defining a technical architecture for the service-oriented application; using the logical domain model, designing a logical data model; defining test cases; and reconciling the designed application services, the user interface, and the technical architecture with the set of requirements and the defined test cases.

In another aspect, the invention is directed towards a method of performing application development, including: developing a page flow for a service-oriented application; developing at least one form and at least one display for entering and displaying data, respectively; creating transfer objects; developing business rules and business objects; creating a physical data model from the logical data model; creating a set of database objects and domain objects; developing a set of data accessor and mappers; and integrating a layer containing the page flow, form, display, and transfer objects with a layer containing the business objects and rules with a layer containing the physical data model, the database and domain objects, and the data accessor and mappers.

In another aspect, the invention is directed towards a system for producing a service-oriented application. A first module is a requirements-gathering module, including: a module for developing a set of requirements for a service-oriented application; a module for developing a list of use cases and a set of use cases for the service-oriented application; a module for developing a process model for the service-oriented application; a module for reconciling the set of requirements with the process model; a module for developing a set of business rules for the service-oriented application; a module for reconciling the set of requirements with the set of use cases and the business rules; and a module for developing a logical domain model for the service-oriented application. The second module is an application design module, including: a module for developing at least one system use case associated with each one of the set of use cases; a module for developing a use case realization; a module for designing a user interface; a module for defining an architecture for the service-oriented application, for defining and designing application services for the service-oriented application, and for defining a technical architecture for the service-oriented application; a module for designing a logical data model; a module for defining test cases; and a module for reconciling the designed application services, the user interface, and the technical architecture with the second set of requirements and the defined test cases. The third module is an application development module, including: a module for developing a page flow for the service-oriented application; a module for developing at least one form. and at least one display for entering and displaying data, respectively; a module for creating transfer objects; a module for developing business rules and business objects; a module for creating a physical data model from the logical data model; a module for creating a set of database objects and domain objects; a module for developing a set of data accessor and mappers; and a module for integrating a layer containing the page flow, form, display, and transfer objects with a layer containing the business objects and rules with a layer containing the physical data model, the database and domain objects, and the data accessor and mappers.

In another aspect, the invention is directed towards a system for performing a requirements-gathering phase in a service-oriented development of applications, including: a module for developing a set of requirements for a service-oriented application; a module for developing a list of use cases and a set of use cases for the service-oriented application; a module for developing a process model for the service-oriented application; a module for reconciling the set of requirements with the process model; a module for developing a set of business rules for the service-oriented application; a module for reconciling the set of requirements with the set of use cases and the business rules; and a module for developing a logical domain model for the service-oriented application.

In another aspect, the invention is directed towards a system for performing an application design phase in a service-oriented development of applications in which a set of use cases and a set of requirements have been defined, including: a module for developing at least one system use case associated with each one of the set of use cases; a module for developing a use case realization; a module for designing a user interface; a module for defining an architecture for the service-oriented application, a module for defining and designing application services for the service-oriented application, and a module for defining a technical architecture for the service-oriented application; a module for designing a logical data model; a module for defining test cases; and a module for reconciling the designed application services, the user interface, and the technical architecture with the set of requirements and the defined test cases.

In another aspect, the invention is directed towards a system for performing an application development phase in a service-oriented development of applications in which a logical data model has been defined, including: a module for developing a page flow for a service-oriented application; a module for developing at least one form. and at least one display for entering and displaying data, respectively; a module for creating transfer objects; a module for developing business rules and business objects; a module for creating a physical data model from the logical data model; a module for creating a set of database objects and domain objects; a module for developing a set of data accessor and mappers; and a module for integrating a layer containing the page flow, form, display, and transfer objects with a layer containing the business objects and rules with a layer containing the physical data model, the database and domain objects, and the data accessor and mappers.

With regard to any of the method aspects, the invention may be directed to a computer-readable medium containing instructions for causing a computer to implement the method. In the same way, with regard to any of the invention aspects, the invention may be directed to a product obtained using the method.

Advantages of the invention may include one or more of the following. Applications or other products are created in a way that is inherently SOA-enabled. The systems provide a common framework for development, and standardizes the skill set demands of a project. The system is adaptable to various types of projects, reduces costs for implementing and maintaining projects, and helps the identification of deliverables.

BRIEF DESCRIPTION OF THE DRAWINGS

FIG. 3(A)-(C) illustrates the methodology of the SODA system according to an embodiment of the invention.

DETAILED DESCRIPTION

In one implementation of a system providing a SODA approach, the system provides a common framework and set of processes within which a project can be built, such as in designing and building a computer software or hardware system. Different entities within an organization, e.g., project teams within a company, can use the same system to build respective projects. Because the projects are built with the same system, efficiency in design, implementation, integration, and maintenance can all result.

For building a project, the system provides software tools that follow defined methodologies to promote development in a common pattern across projects. While the specifics of implementation and operation of a project will be appropriate for the project needs, the surrounding development environment will be common. Project builders can take advantage of this common approach to improve efficiency and reduce cost through improved development time. For example, the common approach to development can provide a higher level of predictability for management and so improve development time. In addition, as new project needs are identified, e.g., in development or maintenance, the system can be modified, e.g., by adjusting an aspect of the framework or adding to the methodology, and so can be adaptable. Communication and feedback with the system developers and the project teams can facilitate this adaptation.

The figures will now be described. It is noted that the SODA field has accumulated a substantial standardized vocabulary which is used to describe components and features of the same. Unless otherwise noted, the terms used in this description have the same meanings as similar terms in the standardized vocabulary, as one of ordinary skill the art would understand them.

Figure 1:
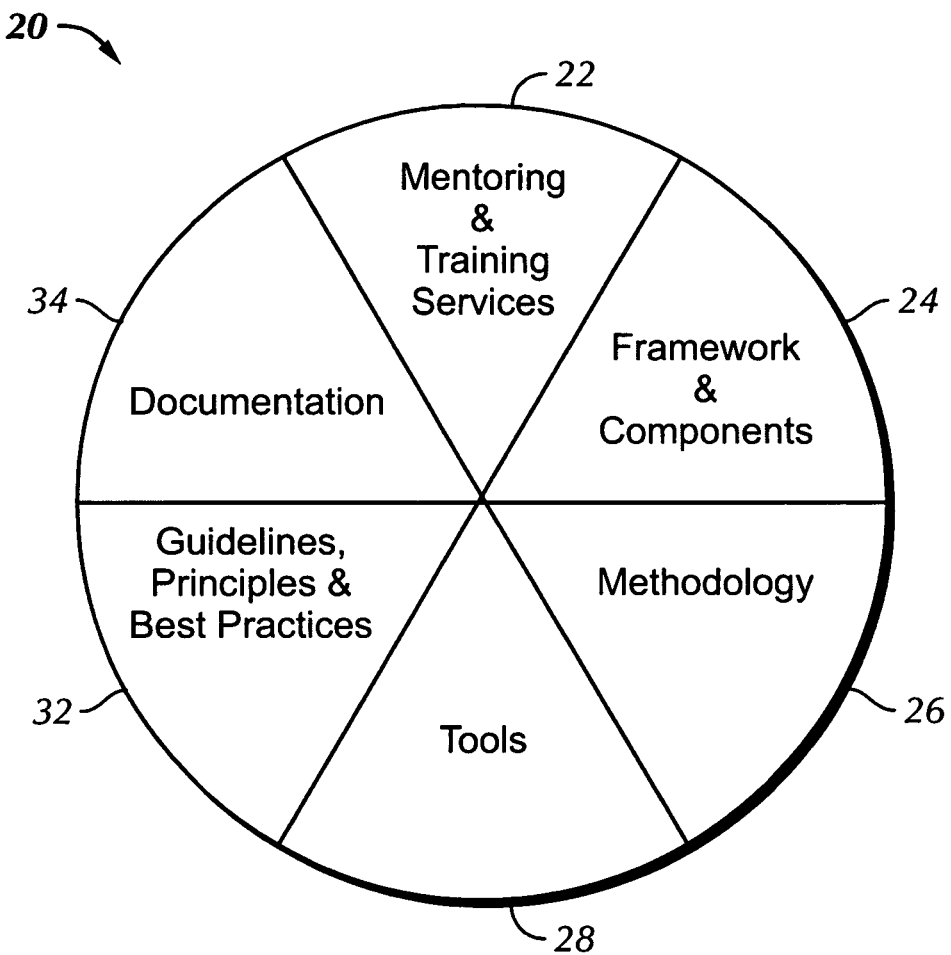
FIG. 1 is a pie chart that shows various components of a SODA system according to an embodiment of the invention.

FIG. 1 shows at a conceptual level the various parts of a SODA system that may include embodiments of the invention. The system 20 includes a set of project mentoring and training services and curricula 22, which may be implemented in a visual and automatic way on a computer or other visual display and playback device. The system 20 also includes its framework and components 24, which are described in greater detail below. Another component is the process methodology 26 of the system, which is also described in greater detail below. The process methodology 26 is integrated within the software development framework. A set of tools 28 form another part of the system 26, and these may include tools available from, e.g., Borland® or BEA™. The tools may also include those related to the Hibernate® ORM solution. These are likewise described in greater detail below.

The system 20 will also generally be accompanied by various guidelines, principles, and best practices, denoted by reference numeral 32, which may include a software architecture document and application developer guidelines. Finally, the system 20 may also include appropriate documentation 34.

The framework and components 24 are now discussed in greater detail. By way of introduction, the components within the SODA system are generally reusable and the same complement the functionality of the application server. The components may include those related to data caching, session management, pagination, views such as tree views, as well as common objects such as a calendar, input masks, and expand/collapse functionality. The components may also include those related to email, event scheduling, notification services, translation and transformation, exception handling functionality, and audit logging. The components may further include those related to internationalization, localization, client-side caching, session façades to manage business objects and provide a uniform service access layer to clients, transaction management, process state management, work queue management, and message routing and queuing.

Figure 2:
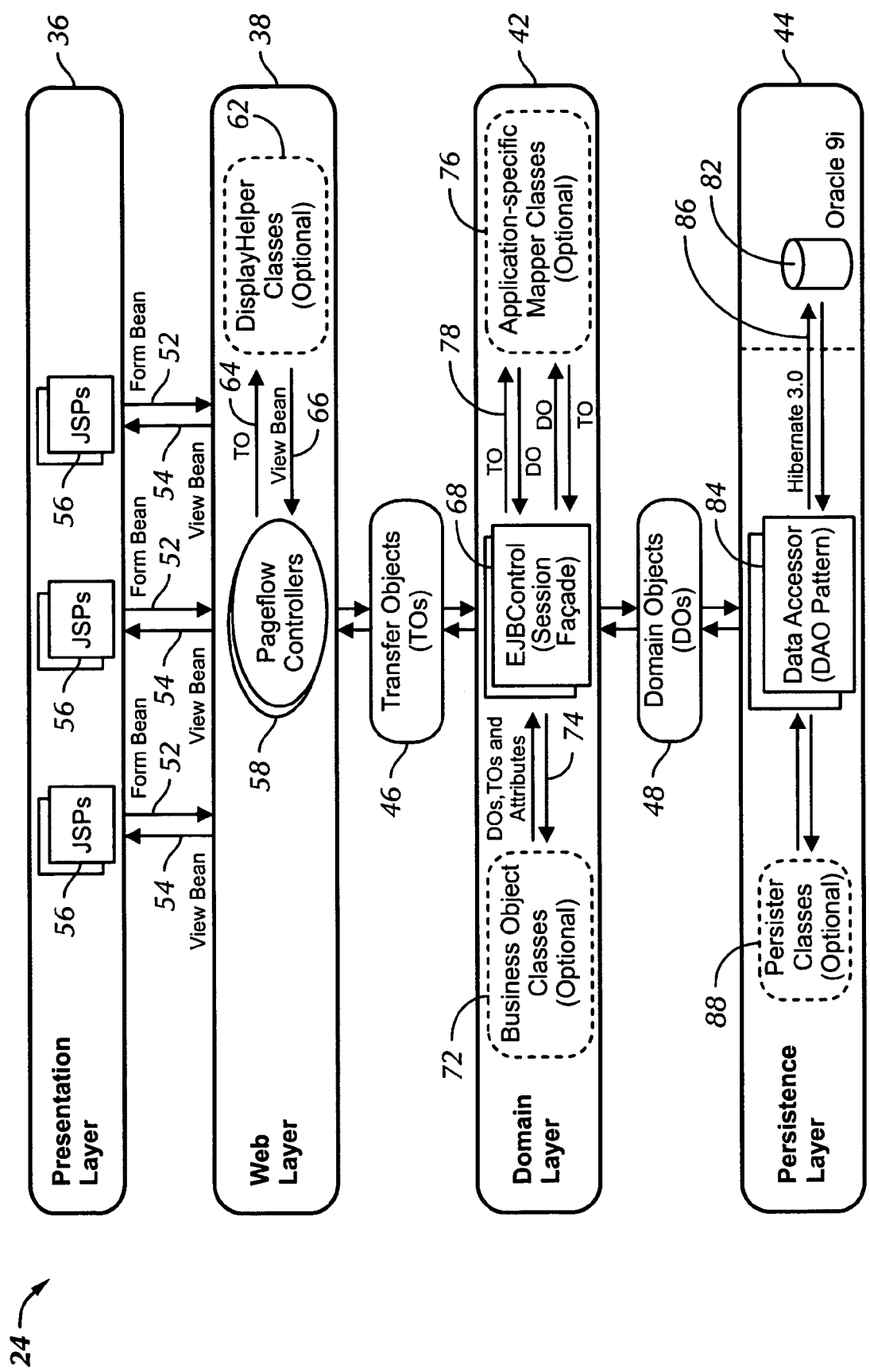
FIG. 2 illustrates the framework of the SODA system according to an embodiment of the invention.

The framework is further shown in FIG. 2, which shows the various framework layers as well as communication paths between the framework layers. The framework layers include a presentation layer 36, a web layer 38, a domain layer 42, and a persistence layer 44.

The presentation layer 36 constitutes the UI parts of the application, and is generally made up of classes that generate, e.g., screens and reports, and includes a number of development components, such as JavaServer® Pages™ (JSPs) 56, which in particular may be employed to develop dynamic web content with Java®. Other such development components may also be employed. The JSPs 56 may access request parameters from the web layer 38 via, e.g., the issuance of form beans 52 and subsequent receipt of view beans 54, the latter used to render a display.

The web layer 38 includes a pageflow controller 58 which communicates with, e.g., optional DisplayHelper Classes 62, via transfer objects 64 and returned view beans 66. The pageflow controller 58 facilitates the communications between the client and the server, managing the sequence of events, and generally controlling what is sent to the presentation layer 36 in response to various actions the user may take.

The web layer 38 communicates in turn with the domain layer 42 via transfer objects 46. The domain layer 42 includes the domain objects, which in many cases are business objects. As such, the same is where the business problem resides, i.e., that which is solved by the application. The domain layer 42 may be thus reusable for different applications.

The domain layer 42 includes a managed control component such as an Enterprise JavaBean® (EJB) control component 68, which may be employed for control of the modular construction of the application. The EJB control component 68 may communicate with optional business object classes via the swap of data objects, transfer objects, and attributes (which in FIG. 2 are collectively referred to as reference numeral 74). The EJB control component 68 may also communicate with optional application-specific mapper classes 76 via transfer objects and data objects (which in FIG. 2 are collectively referred to as reference numeral 78). These application-specific mapper classes 76 are provided to give developers the framework to custom design mapper classes. These mapper classes may perform automatic intelligent mapping to convert data in the domain layer to data in the persistence layer.

The domain layer 42 communicates with the persistence layer 44 via domain objects 48. The persistence layer 44 causes and implements the interaction of the domain objects 48 with permanent or persistent storage, such as a database 82.

The database 82 is accessed via a data accessor 84, which may be a data access object ("DAO") as is employed in the Core J2EE® Design Pattern™, or other similar object, and the same may communicate with the database via, e.g., a persistence framework 86 such as Hibernate® 3.0. The data accessor 84 may also use instances of optional persistor classes 88 to access data in the database 82.

FIG. 3(A)-(C) conceptually illustrates the methodology 26 according to an embodiment of the invention. Referring to FIG. 3(A), the method starts with an input interface 92 through which the user communicates methods, data, components, and so on, into the implementation 96. The implementation 96, as the same is informed by services 98, then processes that which is input and the result, at the output interface 94, is a SOA-enabled application.

FIG. 3(B) indicates how the system streamlines the interaction between the various types of personnel that form the design team for a given process. FIG. 3(C) illustrates conceptually how the SODA system and method allow design and implementation of an application. Without limiting the scope of the invention, it is noted that primarily steps 3-7 are impacted by embodiments of the invention.

Figure 4:
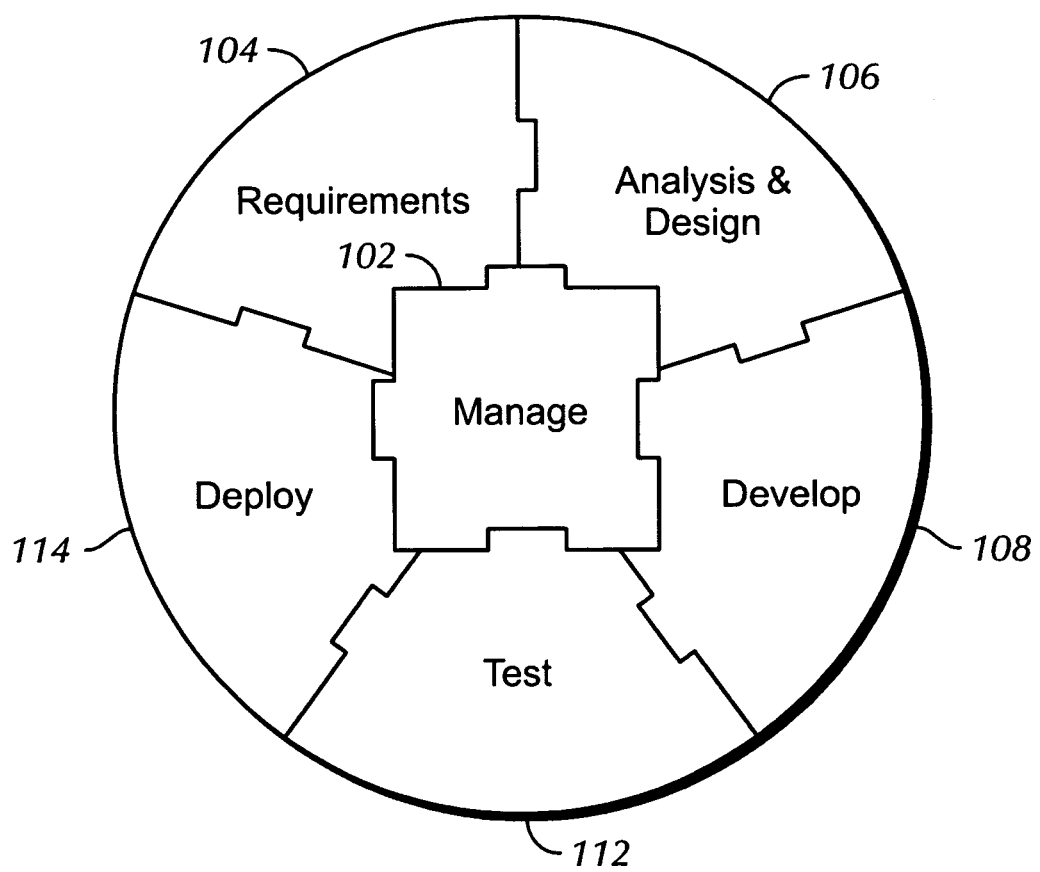
FIG. 4 illustrates various tools that may be employed in the SODA system according to an embodiment of the invention.

FIG. 4 indicates various integrated tools that may be employed for process management in the product development life-cycle. These include a management tool 102, a requirements tool 104, an analysis and design tool 106, a development tool 108, a test tool 112, and a deploy tool 114. Various providers and trade names of such tools are also indicated. Other tools may also be employed. Certain tools may perform more than one function. Further, custom software may also be designed and implemented, so long as the general functionality is maintained. Without limiting the scope of the invention, it is noted that primarily steps 104, 106, and 108 impacted by embodiments of the invention.

The requirements tool 104 provides a facility to name and recognize the requirements of the application. In so doing, the same may facilitate collaboration and communication by and between the individuals involved in developing the requirements. The analysis and design tool 106 may provide a platform to support architects and developers and others involved in the application development process. The develop tool 108 may be used to develop the application, e.g., in a software application embodiment the develop tool 108 may be a Java®—or otherwise—based integrated development environment. The test tool 112 may be used to provide a framework for planning and designing tests of the developed application, running and monitoring the tests, and managing found defects. The deploy tool 114 may be employed to issue and manage the application, as well as to facilitate software changes and configuration management. The management tool 102, which as shown may employ the same system as the deploy tool, may then be used for ongoing application management.

Figure 5:
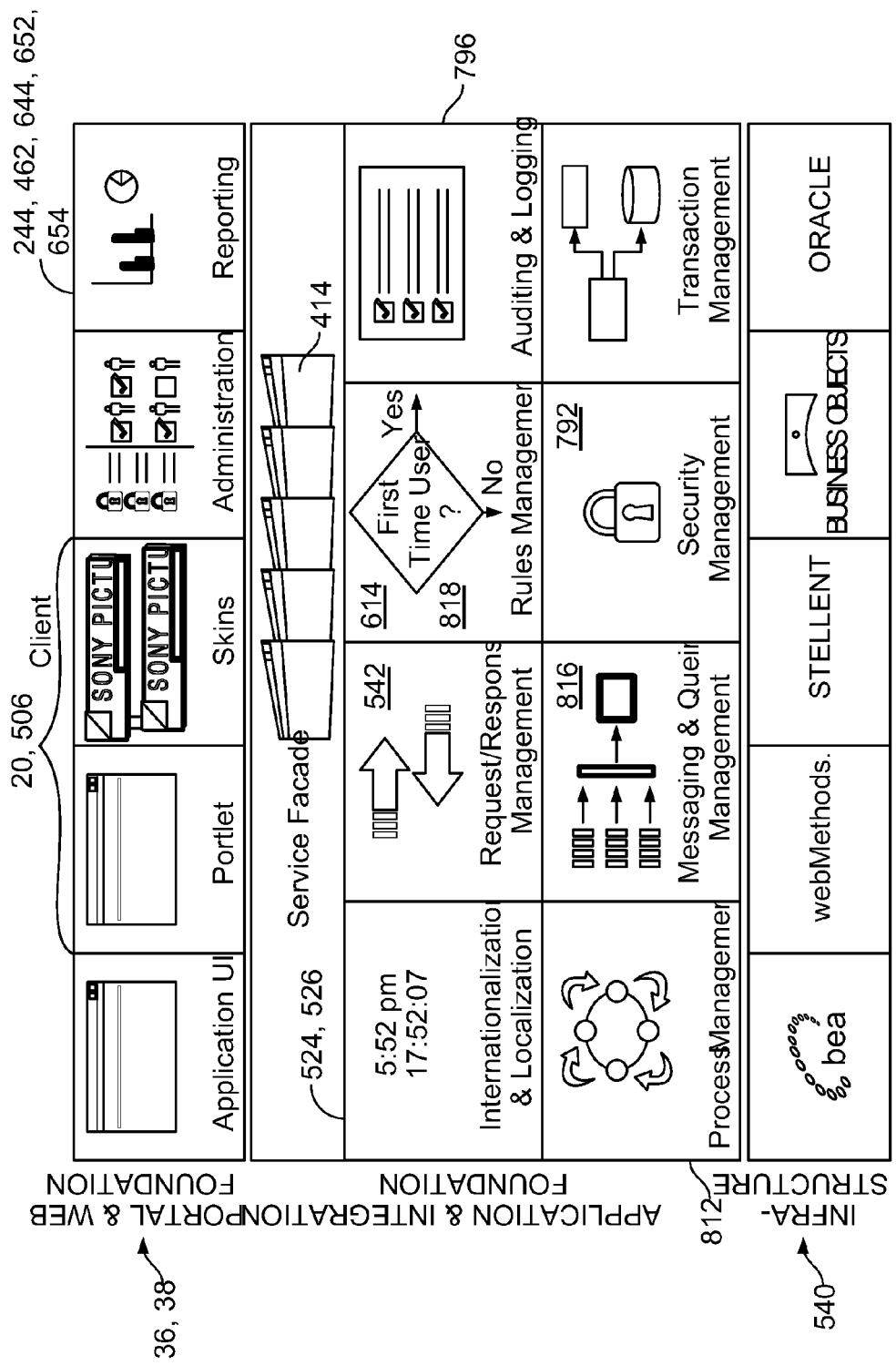
FIG. 5 illustrates the relationship, within the SODA system, of the portal and web foundation, the application and integration foundation, and the infrastructure, according to an embodiment of the invention.

As noted above, the components within the SODA system may include those that provide requisite functionality for applications, including internationalization, localization, provision of service façades to manage business objects and to provide a uniform service access layer to clients, transaction management, process management, provisions for messaging and queueing, and security. FIG. 5 indicates how these components can act as a link between the client web portal and the underlying infrastructure.

Figure 6:
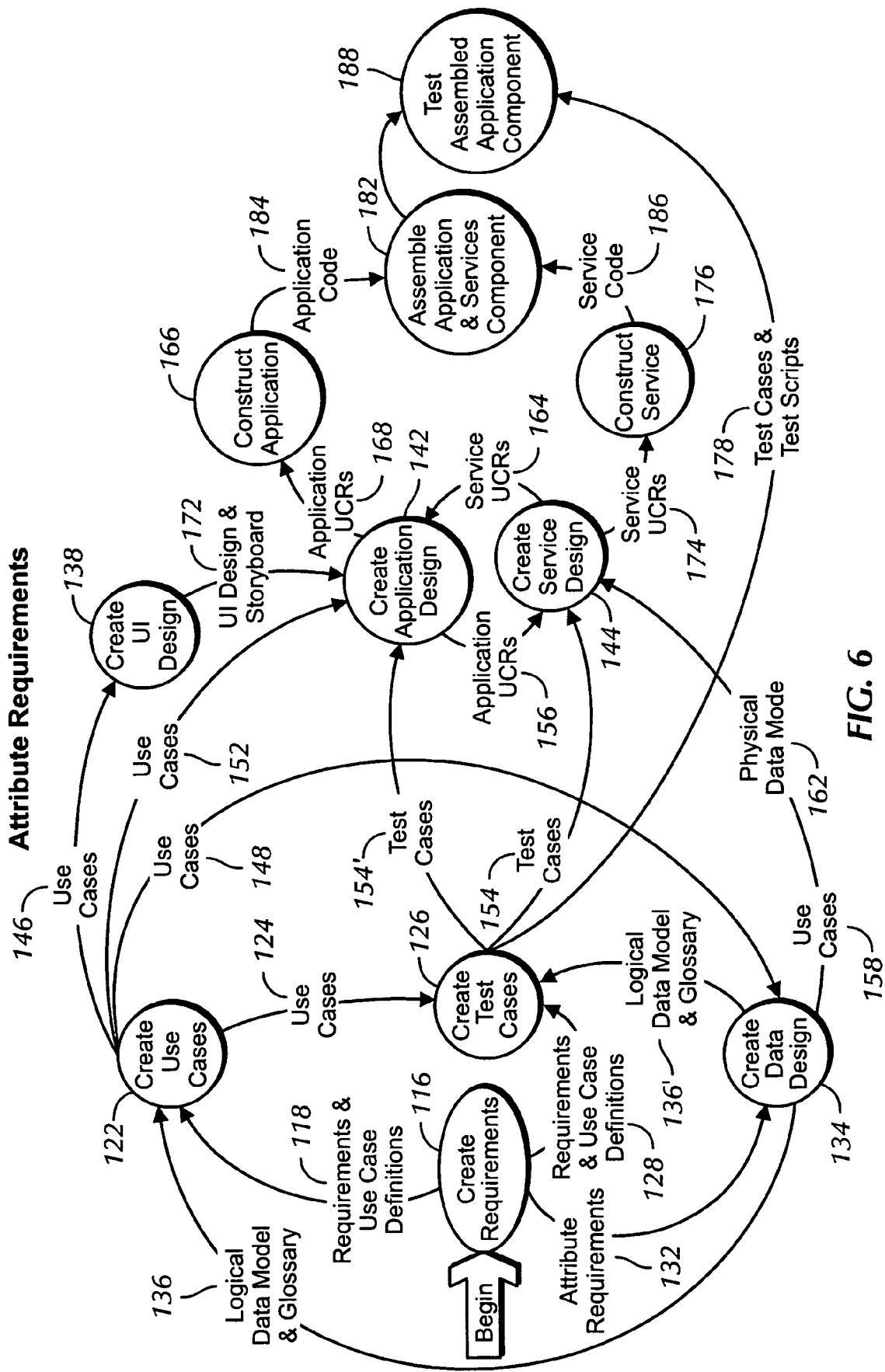
FIG. 6 illustrates a process chart of a state change model that may be employed in the SODA system according to an embodiment of the invention.

FIG. 6 illustrates a state change model according to an implementation of the system and method of the invention. It is noted that FIG. 6 is a high-level overview, and the system described briefly in connection with that figure is described in greater detail below in the process and architecture diagrams.

Referring to FIG. 6, the requirements for the desired product or application are created (step 116), along with use case definitions pertaining to the requirements, resulting in a set of requirements and use case definitions 118 and 128 (indicated by different reference numerals as they are used in respective different subsequent steps). The requirements and use case definitions 118 are employed to create (step 122) use cases 124, 146, 148, and 152, these sets of use cases providing the basis for the set of possible interactions between systems and users related to particular functions (as above, indicated by different reference numerals as they are used in respective different subsequent steps).

The use cases are generally identified and defined by a business analyst, and are the set of business-level functions that the application is intended to perform. For example, use cases may include "manage warehouses" or "release a version of developed technology". System use cases, on the other hand, are the underlying technical functions required to perform the given business use case, and are often defined by a technical analyst. In the warehouse example above, a system use case may pertain to adding a warehouse to an existing set of warehouses. The ability of a user to add or edit products or attributes defined by use cases and system use cases depends on their privilege level and consequent level of access: administrator, super-user, read-only, and so on.

After the creation of the use cases, certain next steps can take place in parallel, including the creation of the UI design (step 138), the creation of the application design (step 142), the creation of the data design (step 134), and the creation of test cases (step 126) with which to test the design.

The requirements and use case definitions 128 are employed to assist in the creation (step 126) of the test cases 154 and 154', as well as test cases and test scripts 178. Finally, the creation of requirements (step 116) also includes a definition of attribute requirements 132. The attribute requirements may also be employed in the creation of the data design (step 134), as the data design depends in part of the attributes required.

The test cases 154 may be used in part in the creation of the service design (step 144), and the test cases 154' may be used in part in the creation of the application design (step 142). In particular, the test cases 154 and 154' (and test procedures and protocols) have to be created such that the same are appropriate for testing the functionality of the application design and the service design. Finally, the test cases and test scripts 178 are used in the step of testing the assembled application components (step 188).

The step of creating (step 134) the data design and physical data model 162 leads to the creation of the logical data model and glossary 136 and 136'. The logical data model 136 may be employed in the creation of the use cases (step 122) and the creation of the test cases (step 126). In particular, the data design team has to work with the business specialists to ensure the data entities are appropriate for the business. For example, in the warehouse example above, there may be a number of fields that are required to add a warehouse. The logical data model has to incorporate this business information in the use cases so that all the necessary field information is captured. The logical data model and glossary 136' must further inform the create test cases (step 126), as the test cases have to be designed to test the functionality of the data model.

The physical data model 162 may inform in part the creation of the service design (step 144), as the data structure has to be appropriate to achieve the services required.

As noted above, the use cases 146 are used in part to create the user interface design (step 138). The result of the user interface design (step 138) is a user interface design and storyboard 172, described in greater detail below, and the same is in turn used as part of the creation of the application design (step 142).

The creation of the application design (step 142) results in application use case realizations (UCRs) 156 and 168, where UCRs 156 may be employed in the construction of the application (step 166) and UCRs 168 may be employed as part of the creation of the service design (step 144). The creation of the service design (step 144) itself creates service UCRs 164 and 174, where the former may be fed back to the creation of application design (step 142) and the latter used in the construction of the service (step 176). The construction of the service (step 176) culminates in the assembly of the application and services component (step 182).

Another aspect of the assembly of the application and services component (step 182) is the application code 184, which results from the construction of the application (step 166). In the final step, the assembled application and services component (from step 182) is tested (step 188) using the test cases and test scripts 178.

The above steps are now described in greater detail.

Figure 7:
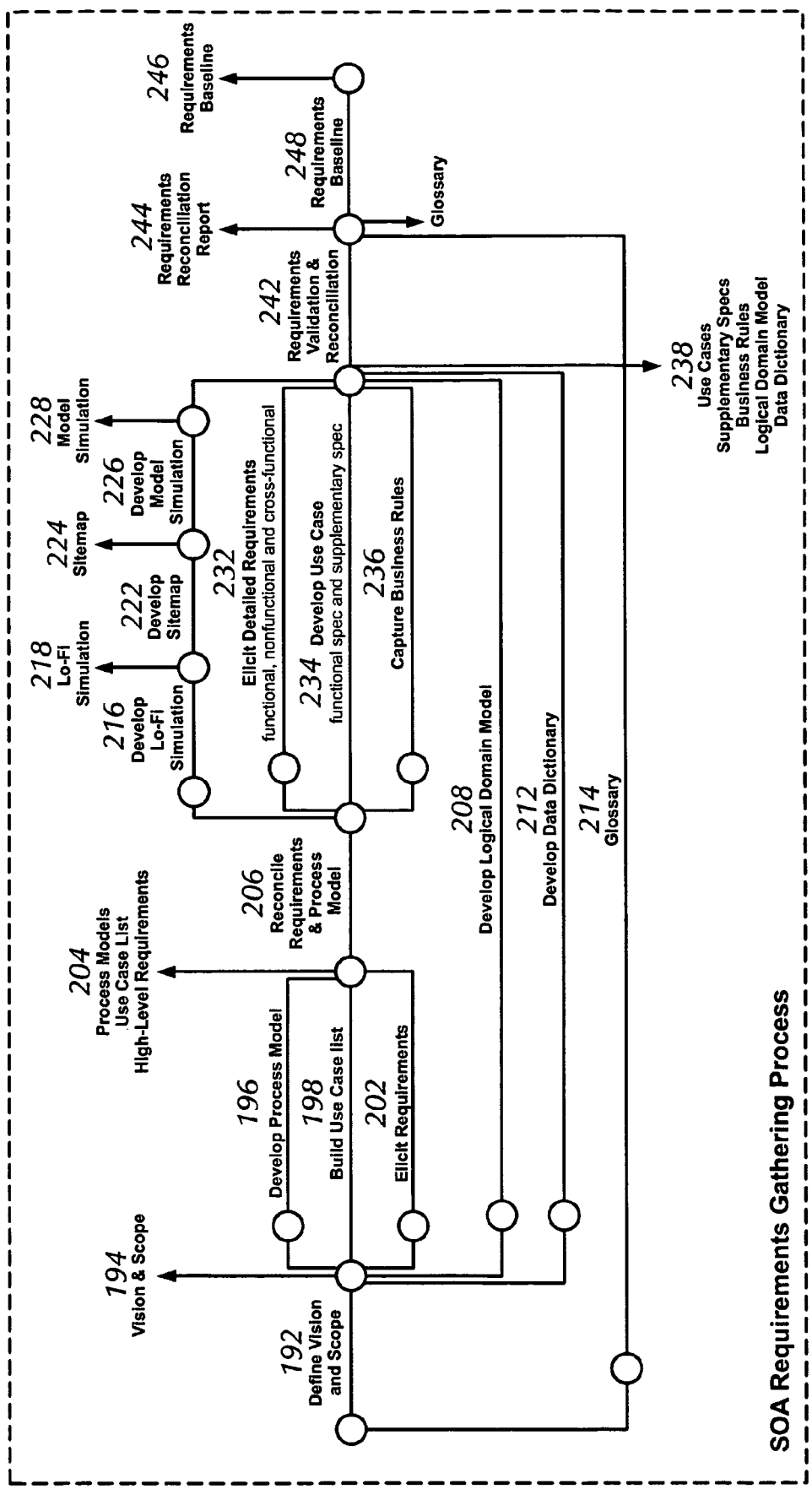
FIG. 7 illustrates a process chart of a requirements gathering method that may be employed in the SODA system according to an embodiment of the invention.

Referring to FIG. 7, a process diagram is shown for the requirements gathering phase. This diagram generally includes a subset of steps and components shown in FIG. 6, such as steps for the creation of use cases and test cases, and the same's associated results.

The phase of gathering requirements begins with the initial step of defining the vision and scope of the project (step 192). This step generally defines what the project or application is to do or perform, how far-reaching the same is, and the overall goals. The output or result of this step is a statement of vision and scope 194. Following the definition of the vision and scope (step 192), subsequent steps include developing a process model (step 196), building the use case list (step 198), and eliciting the requirements (step 202), which are generally high-level requirements. The results of these steps are grouped collectively in the figure as reference numeral 204.

In more detail, the step of developing a process model (step 196) creates an idea of how the system should proceed to achieve the goals set out previously (step 192). The build use case list (step 198) creates a list of all the scenarios that describe how the system should interact with users to achieve a desired goal or function. The step of eliciting requirements (step 202) inquires of the appropriate designers and engineers statements of what the system must do, generally in terms of business goals, product goals, and process goals.

The next step is that the results of these prior steps should be reconciled (step 206). In particular, the process model and the requirements undergo a step of reconciliation in order to ensure that the process as modeled meets or can meet the required goals. In this description, the term "reconcile" is generally used to mean that one item is checked against another for accuracy, in order to ensure that the two (or more) are congruous, work together properly, and are consistent. According to context, the term may further refer to a check that all factors have been accounted for, and that nothing substantial has been omitted. In this case, the process model is being checked against the requirements to ensure that the process model can meet the needs of the requirements.

The defined vision and scope 194 can also serve as the basis for a step of developing the logical domain model (step 208), which provides the conceptual model of the system and describes the various entities within the same and how they interact. It further describes how the data is organized. A step which may run in parallel is the development of the data dictionary (step 212), which is, e.g., metadata that contain definitions and representation of data elements. A glossary may also be developed (step 214) to define the core concepts, and the same may be refined over the course of the project as the concepts are refined.

Following the reconciliation of the requirements and process model (step 206), various steps may be taken and the same performed in a parallel fashion. First, the reconciled requirements and process model may be employed to develop (step 216) an initial simulation 218 having a simplified architecture, e.g., one incorporating only wire-frame visuals that indicate what the general layout of the page are and what they will contain. This may be followed by the development (step 222) of a sitemap 224. Finally, a model simulation 228 may be developed (step 226). The model simulation may be a working version of the initial simulation, including working links, or at least links that appear to work, in order to approximate the basic functionality of the system.

Also following the reconciliation, more detailed requirements may be elicited (step 232), where these requirements include functional, non-functional, and cross-functional requirements. Further, use cases may be further developed (step 234), using as a base the list built previously (step 198). As noted above, the use cases generally describe the various functions that the application is designed to perform, from a business point of view.

Finally, the reconciliation (step 206) leads to a step of capturing the business rules (step 236), and the same may be captured by being discovered or otherwise deduced from the requirements or process model.

The above steps result in use cases, supplementary specifications, business rules, a logical domain model and a data dictionary, and the same are indicated collectively in FIG. 7 as reference numeral 238.

Following the development of these components, the requirements validation and reconciliation (step 242) may occur. This step verifies that the requirements have been met and that the various functional layers, such as data, design, and UI, are reconciled, at least at an initial level. The glossary may be finalized at this point, and a requirements reconciliation report 244 may be generated. A requirements baseline 246 may then be developed (step 248), concluding the requirements gathering process.

Figure 8:
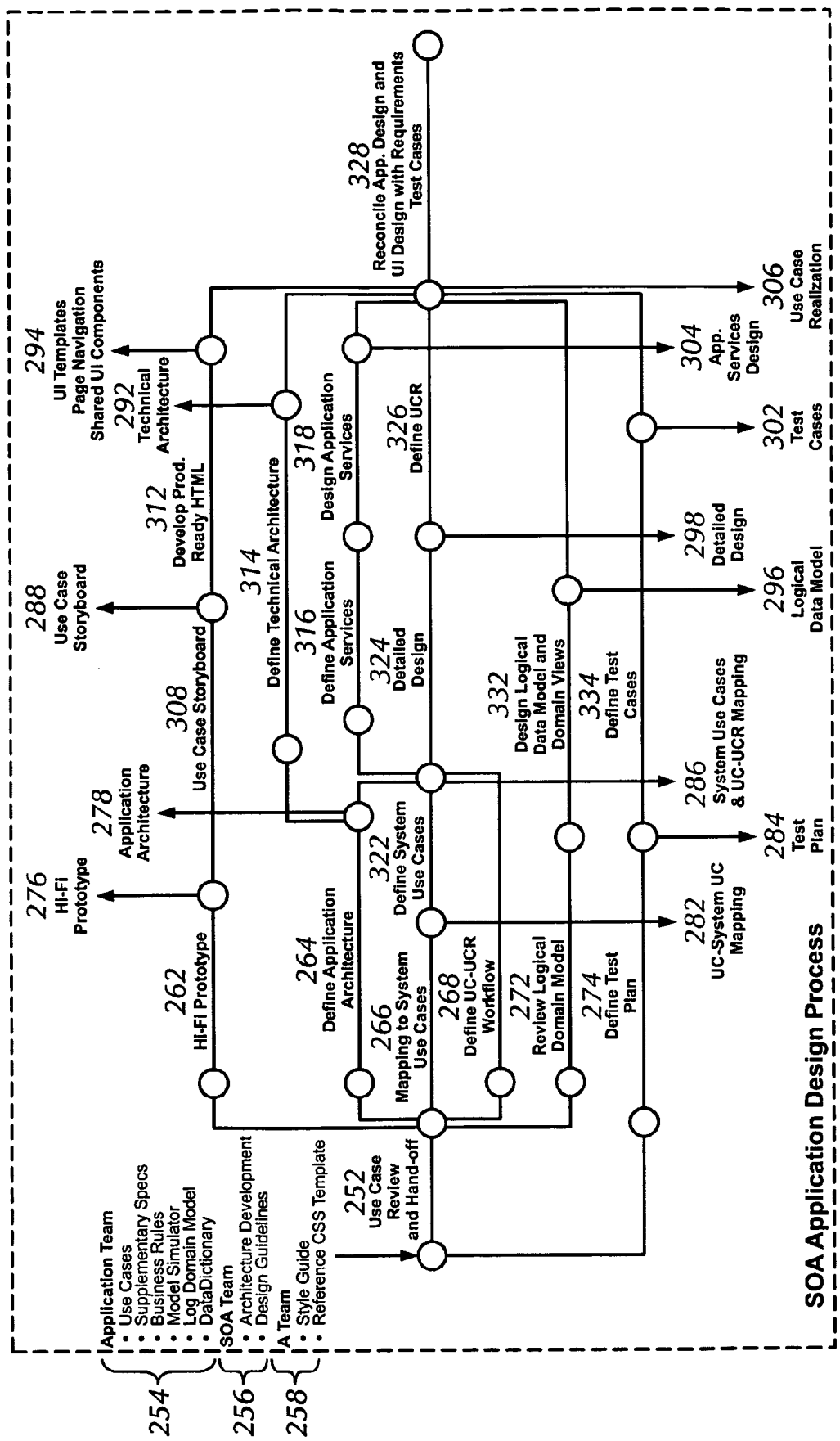
FIG. 8 illustrates a process chart of an application design model that may be employed in the SODA system according to an embodiment of the invention.

FIG. 8 shows the process according to an embodiment of the invention showing in particular application design. This process diagram indicates on the left hand side the various teams that may typically be responsible for carrying out the steps of the invention, as the same is implemented in a software application. These include the application team 254, responsible for designing use cases, specifications, business rules, model simulations, the logical domain model, and the data dictionary. The SOA team 256 is generally responsible for designing the architecture document and the design guidelines. The information architecture team 258 is responsible for designing the style guide and reference CSS templates.

The first step to review the use cases (step 252) as developed in FIG. 7 (step 234). After this, the same may be mapped (step 266) to system use cases and the system use cases developed (step 322). The system use cases are generally technical functions that provide the underlying infrastructure for the use case functions to be performed. For example, if a use case is to "maintain sales plan", one of many system use cases may be to "update sales plan". Mapping causes system use cases to become associated with a given business use case. This step results in creation of the use case and system use case mapping 282.

Following the definition of the system use cases, the detailed design (step 324) may occur, in which, e.g., a UML model is employed to detail how the components will interact with each other, e.g., what sort of objects are needed to satisfy the system use cases, including what sort of objects exist and what will be the objects to which the objects will communicate. In other words, what data will be needed and what data will be the result. The detailed design also determines aspects of the communications scheme, including the sequence of components, especially in the case where multiple components work together, such as where there is a client component, a server component, a database component, and so on.

The models present in the detailed design will usually cover multiple system use cases. However, using the detailed design, the individual UCRs may be created and defined (step 326) using a tool such as, e.g., Together Architect® by Borland®. The UCRs, which are often created by an application designer or application architect and are ideally self-contained in terms of the models presented, are employed by an application developer to write the implementing code. They may include statements of functionality that are intended to be reused, especially basic functionality, such as sorting, filtering, etc.

In parallel with the use case definitions, the user interface may be transformed from a initial wire-frame design to one with significantly-enhanced functionality (step 262). The result of this step is a high-fi prototype 276, which generally incorporates the model architecture, including buttons, pagination controls, etc.

Following this step, a use case storyboard 288 may be developed (step 308), in which the way in which users interact with the user interface is defined. This may be, e.g., a list interface, a tree interface, etc. Generally, a uniform UI is desired across the application.

Once the use case storyboard is developed, production-ready HTML (or other such) coding may be written, resulting in UI templates, page navigation features, and shared UI components, collectively referred to by reference numeral 294.

Also in parallel, the application architecture 278 may be defined (step 264), the application architecture also informing the detailed design (step 324). The application architecture generally refers to the system as decomposed into various components, as well as the responsibilities and interconnections between components. The application architecture definition step leads to the step of defining (step 314) the technical architecture 292, which generally refers to the structured process of designing and building the application infrastructure at the enterprise level, including addressing issues of server hardware, network, storage, backup, etc.

Another parallel step is the definition of the use case and UCR workflow (step 268), which concerns how the different use cases are related and they may be processed and managed in relation to one another. Upon completion of this step, and the completion of the step of defining the use cases, the combination of the system use cases and use case and UCR mapping (collectively referred to by reference numeral 286) is completed.

A further parallel step is the review of the logical domain model (step 272), which leads to designing (step 332) the logical data model 296 and domain views.

Finally, a test plan 284 is defined (step 274), and test cases 302 are defined (step 334).

Once the system use cases are defined, the application services may be defined (step 316) and designed (step 318). These pertain to the set of services that the application will provide. For example, if a use case is to "manage warehouses", the service definitions may include a list of services provided, such as "add a warehouse", "retrieve a warehouse", "retrieve all warehouses", etc. If the use case is to "release an item", the service definitions may include "update release", "retrieve release", etc. The design of the application services may include analysis and consideration of what data is needed to perform the service, and what data will result from the performance of the service, and how the resulting data should be communicated and stored. The application services design may further encompass such steps as, e.g., defining how an XML message will appear, how a standard document template will be displayed, and so on.

The last step in the application design process is to reconcile the application design and the user interface design with the requirements and test cases (step 328). Prior to this step, the branches to the left on FIG. 8 have been completed. The reconciliation step checks that the branches have been completed properly. For example, the reconciliation step checks that the user interface contains all the necessary fields for completion of the business use cases. The step would also check that all the necessary test cases are present to cover the possible use scenarios.

Figure 9:
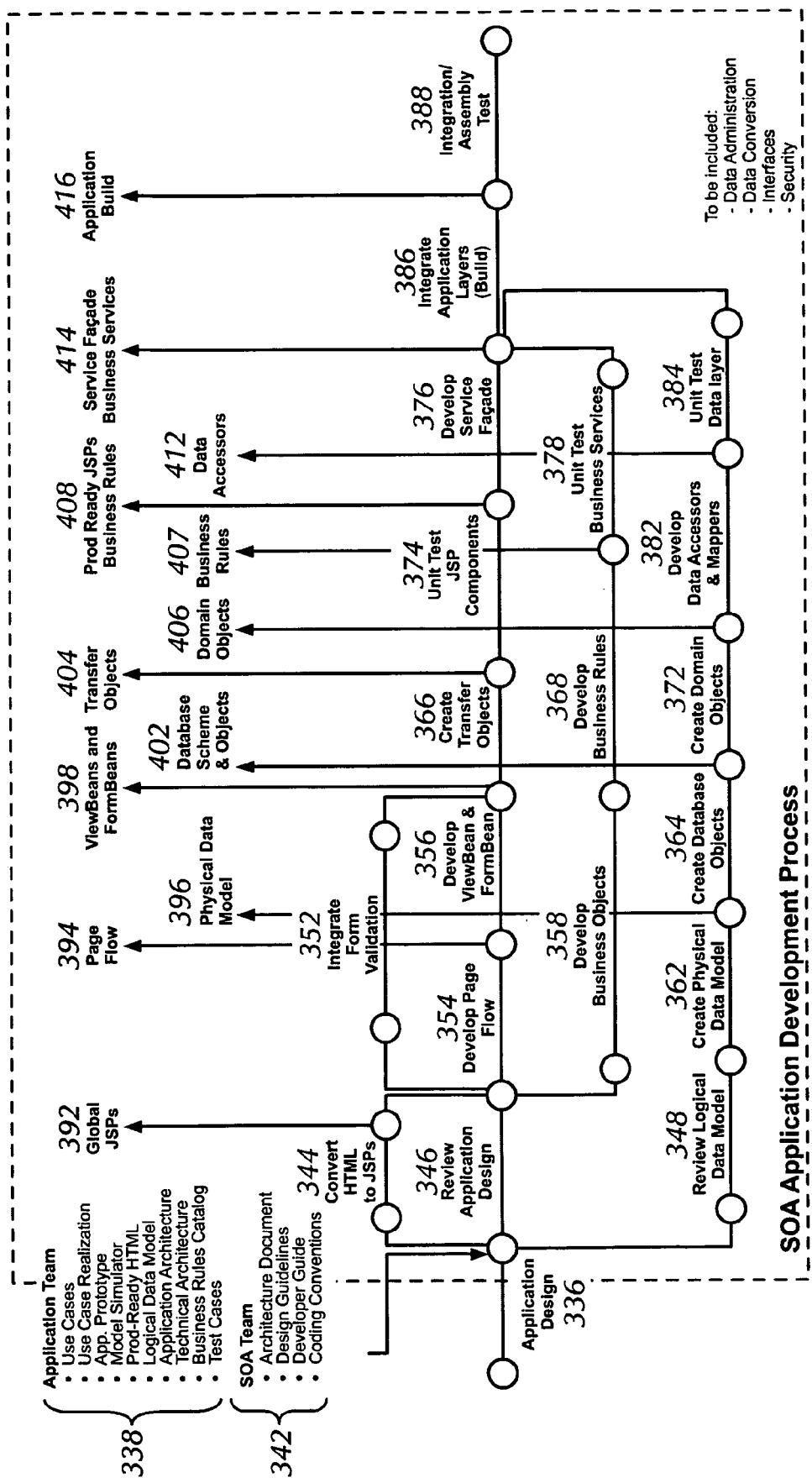
FIG. 9 illustrates a process chart of an application development model that may be employed in the SODA system according to an embodiment of the invention.

Referring to FIG. 9, the application development process is detailed. This process diagram indicates on the left hand side the various teams that may typically be responsible for carrying out the steps of the invention, as the same is implemented in a software application. These include the application team 338, responsible for developing use cases and UCRs, prototyping the application, developing the production-ready HTML, developing the logical data model and the application and technical architecture, and creating the business rules catalog and test cases. The SOA team 342 is generally responsible for designing the architecture document and the design guidelines, as well as creating the developer guide and coding conventions.

Following the application design 336, an initial step is to review the application design (step 346). This step involves the teams reviewing the results and process of FIG. 8 to determine if additional information is required. Prior to or contemporaneous with this step may be two other steps. First, the production-ready HTML may be converted (step 344) to JSPs 392. This process may be optionally accomplished in a partially or fully automated fashion. It will also be recognized that the use of JSPs is merely exemplary—other technologies may also be employed. The JSPs 392 may then be used in the development of the page flow (step 354), which primarily concern the server-side interactions and sequencing, as discussed above.

Another set of steps that may be pursued at this time involves development of the data layer. In particular, this process begins with a review (step 348) of the logical data model developed previously. The physical data model 396 may then be created (step 362). The database schema and objects 402 may then be created (step 364), followed by the creation (step 372) of the domain objects 406. The data accessors 412 and mappers are then developed (step 382), followed by a test of the data layer (step 384).

Following the review of the application design (step 346), several processes can occur in parallel. First, form validation can be integrated into the system (step 352). This ensures that the form information which will be asked of, e.g., a user or process, is appropriate and sufficient to complete the desired business process. At the same time, the business objects may be developed (step 358), followed by development (step 368) of the business rules 407, which are the rules that must be enforced on the server when the business process is being executed. After these steps, the business services may be tested (step 378), with the result being production-ready JSPs as well as business rules pertinent to the JSPs, collectively referred to here by reference numeral 408. The JSP-related business rules are validation type rules that have to be enforced on the JSPs. These are generally rules relating to form validation and the user interface.

Also following review of the application design, the page flow 394 may be developed (step 354). The ViewBeans™ and FormBeans™ 398 may then be developed (step 356), which as noted above provide for data requests and responses as well as displays. The transfer objects 404 may then be created (step 366), and the JSP components may be tested (step 374).

While Java®-related components have been described here, it will be apparent to one of ordinary skill in the art, given this teaching, that alternative platforms may be employed in implementations of the invention.

Referring back to FIG. 7, it may be desired to hide, or at least not expose, underlying individual services as defined in the application services definition (step 316). To this end, a service façade 414 may be developed (step 376). In this way, a higher-level abstract service façade is exposed to communications, rather than the lower-level more granular services, which are usually significantly more sensitive. The use of a service façade also ensures that what is designed is what is expected to be seen. The more granular lower-level services may not be as easily translatable into the desired business result.

Following the culmination of the above steps described in FIG. 9, the application layers may be integrated (step 386), resulting in the application build 416. The assembled and integrated system may then be tested (step 388) for gross errors, incompatibilities, and other items related to the assembly and integration. Following this, the test phase may begin, in which the functionality is tested.

Figure 10:
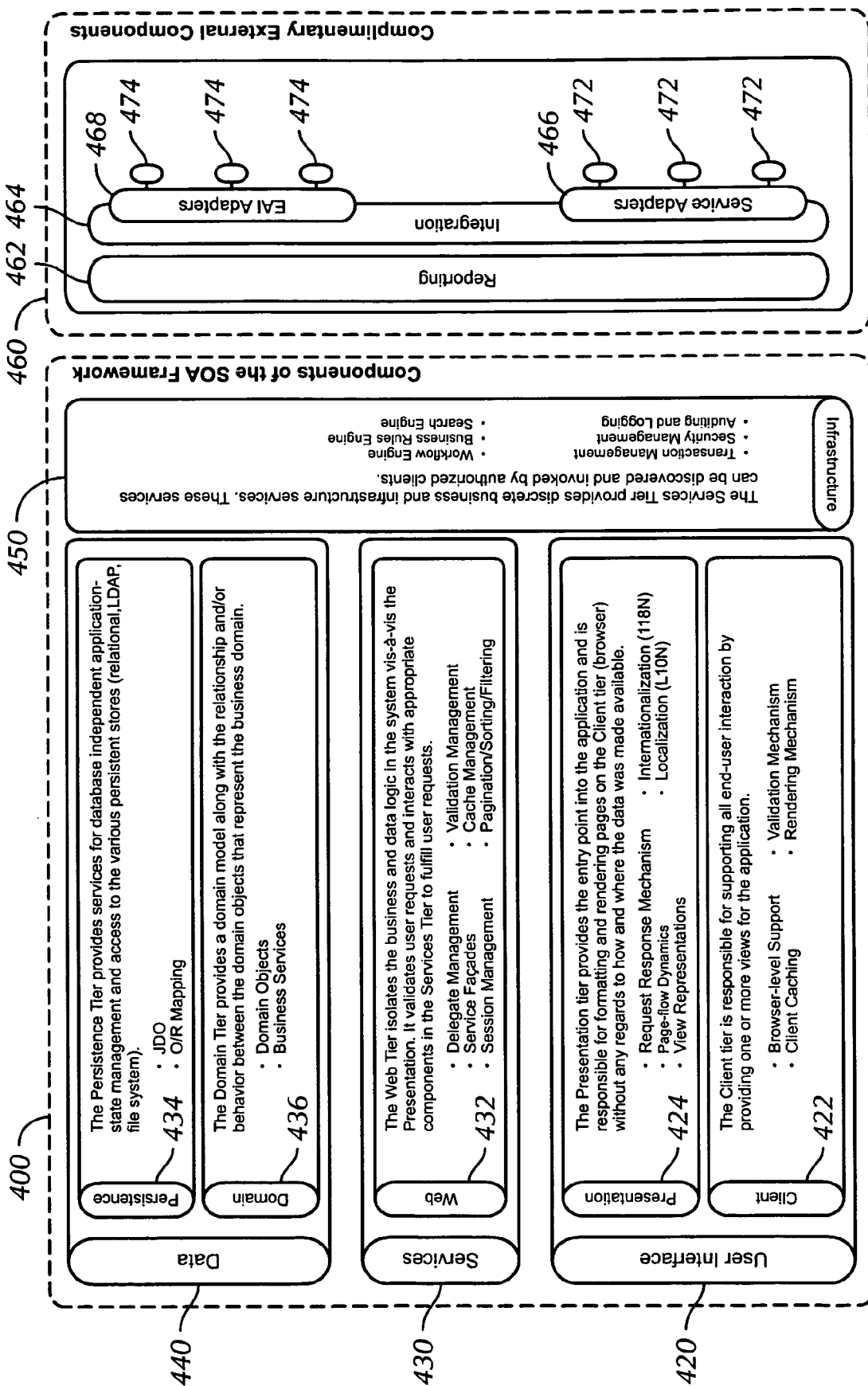
FIG. 10 illustrates the conceptual architecture of the SODA system according to an embodiment of the invention.
Figure 11:
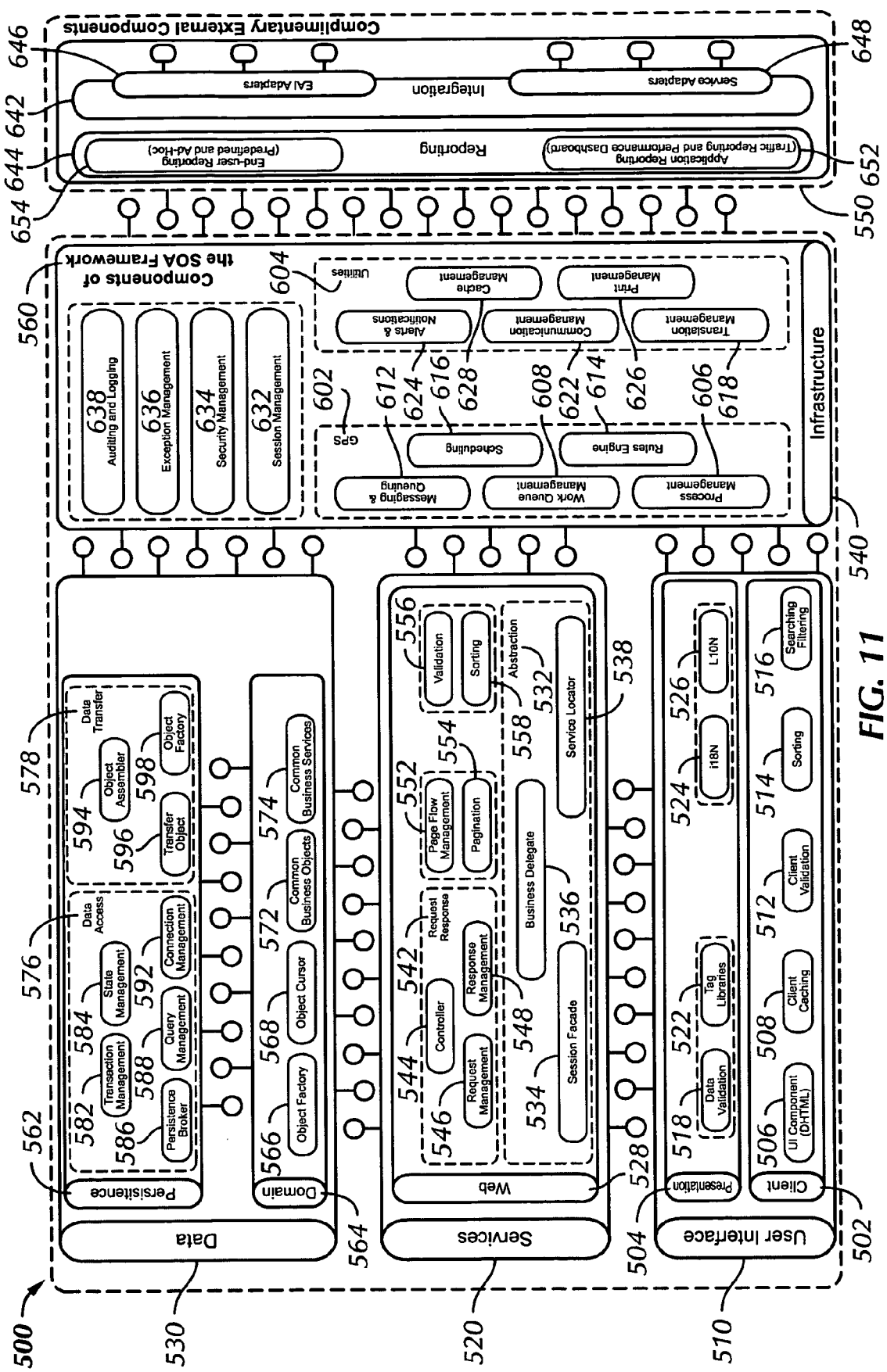
FIG. 11 illustrates the logical architecture of the SODA system according to an embodiment of the invention.
Figure 12:
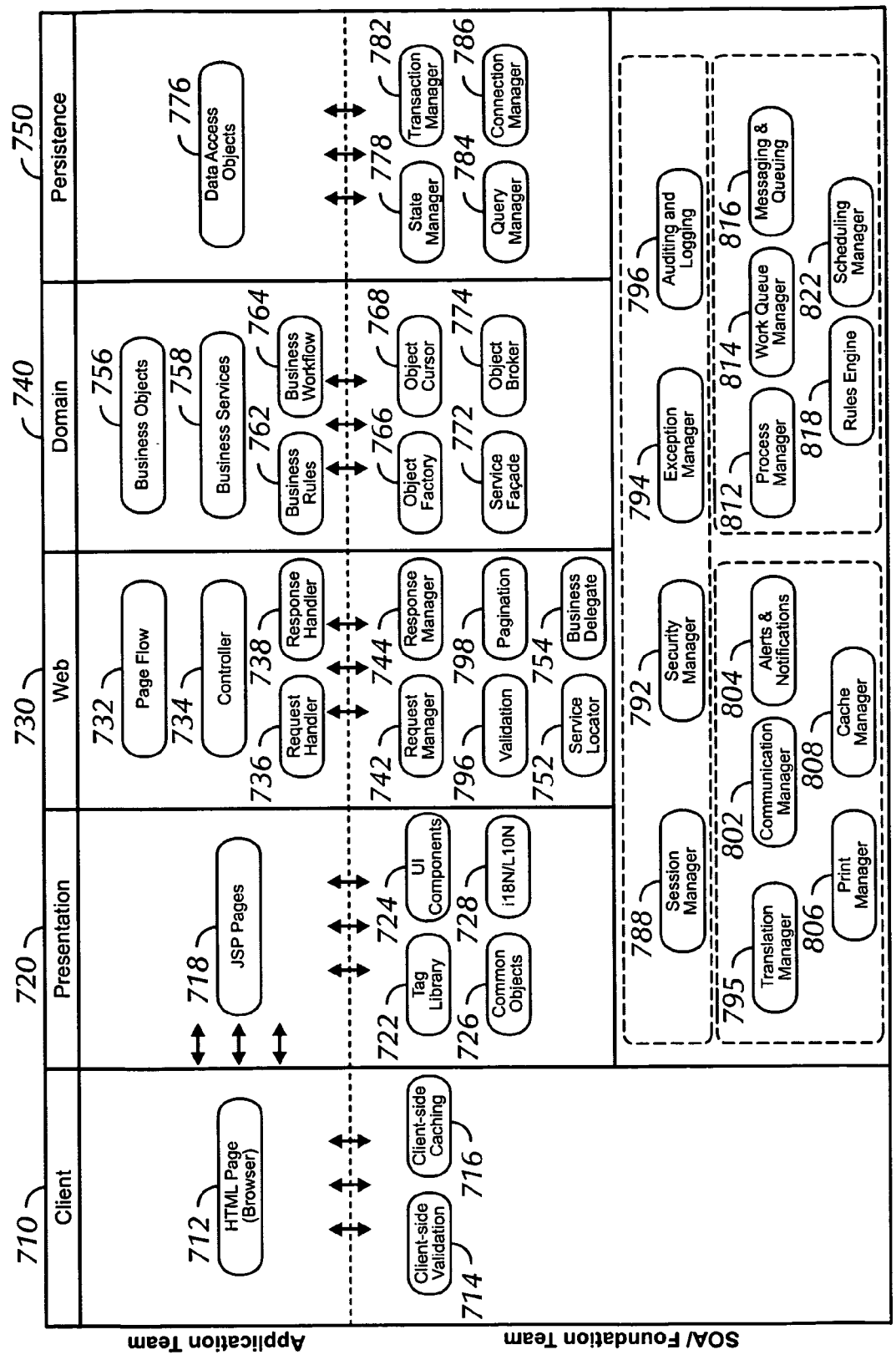
FIG. 12 illustrates an application view of the SODA system according to an embodiment of the invention.

FIGS. 10-12 describe the technical architecture and an application view of the system. The conceptual architecture is described in FIG. 10 and the logical architecture is shown in FIG. 11. An application view is depicted in FIG. 12.

Referring to the conceptual architecture shown in FIG. 10, an infrastructure module connects together a user interface 420, a services module 430, and a data module 440. A set of complementary external components 460 is also shown.

The user interface 420 includes a client layer 422 and a presentation layer 424. The client layer 422 supports end-user interactions by providing various views for the application. The client layer may include browser-level support, client caching, a validation mechanism, and a rendering mechanism.

The presentation layer 424 provides an entry point into the application and is responsible for formatting and rendering pages on the client tier or browser without respect to the data source. The presentation layer accordingly provides a request response mechanism, a system for page flow dynamics, view representation, internationalization, and localization.

The services layer 430 includes a web component 432 that isolates the business and data logic in the system vis-a-viz the presentation. The web component 432 also validates user requests and interacts with appropriate components in the service layers to fulfill user requests. These components may include those pertaining to delegate management, service façades, session management, validation management, cache management, as well as standard functions such as pagination, sorting, and filtering.

A data layer 440 includes a domain component 436 and a persistence component 434. The former provides a domain model as well as the relationship or behavior between the domain objects that represent the business domain. The persistence component 434 provides services for database independent application-state management as well as access to the various persistent stores, which may be, e.g., relational, LDAP, file system, etc. The same is accordingly responsible for, e.g., Java data objects and object relational mapping.

An infrastructure layer 450, which spans the above layers, provides discrete business and infrastructure services which can be discovered and invoked by authorized clients. The infrastructure services include transaction management, security management, auditing and logging, a workflow engine, a business rules engine, and a search engine.

The last component shown in the conceptual architecture diagram of FIG. 10 is the complementary external components 460. These may include a reporting component 462 and an integration component 464. The integration component includes a number of service adapters 466 (shown with connecting modules 472) and a number of enterprise application integration adapters 468 (shown with connecting modules 474).

The logical architecture 500 of the system and method is shown in FIG. 11. This architecture includes a user interface component 510, a services component 520, a data component 530, an infrastructure component 540, and complementary external components 550. As shown, the user interface component 510 interfaces with the services component 520, which in turn interfaces with the data component 530. All of these components interface with the infrastructure component 540, and the infrastructure component in turn interfaces with the complementary external components 550.

As in the conceptual architecture, the user interface component 510 includes a client component 502 and a presentation component 504. The client component includes UI components 506, which may be implemented in DHTML or other such platforms, client caching components 508, client validation components 512, and basic functionality components such as sorting 514 and searching/filtering 516. The presentation component 504 may include components pertaining to data validation 518, tag libraries 522 for common tasks, as well as components for internationalization 524 and localization 526.

The services component 520 includes web components 528 pertinent to web functionality. These include abstraction components 532 such as a session façade component as discussed above, a service locator component 538, and a business delegate component 536. The business delegate component 536 is an example of the delegate management function, and functions like a broker, delegating business processes, tasks or jobs it receives through the interlayer communication framework to various components or services. The web component 528 includes a request/response component 542 having components including a controller 544, a request management component 546, and a response management component 548. The web component 528 further includes related components for page flow management 552 and pagination 554. The page flow management 552 may include a delegate management function as well, to address cases where the page flow can fork to one or another path, and the delegate management component or business delegate can force one or the other path. Other functionality may be provided by, e.g., a validation component 556 and a sorting component 558.

The data component 530 includes a domain component 564 and a persistence component 562. The domain component 564 includes a factory for objects 566, an object cursor component 568, a set of common business objects 572, and a set of common business services 574. These components interface, as shown, with the persistence component 562, which is divided into a data access component 576 and a data transfer component 578. The data access component 576 includes components for transaction management 582, state management 584, a query management 588, connection management 592, as well as a persistence broker 586. The data transfer component 578 includes an object factory component 598 for creation of transfer objects, the transfer objects themselves 596, and an object assembler 594.

The infrastructure component 540 provides the components of the SODA framework, and these may include a business process management component 602 and a utilities component 604. The BPM component 602 includes components for process management 606, work queue management 608, messaging and queuing 612, a rules engine 614, and scheduling 616. The utilities component 604 includes components for translation management 618, communication management 622, alerts and notifications 624, print management 626, and cache management 628.

The complementary external components include a reporting component 644 and an integration component 642. The reporting component 644 includes an application reporting component 652, such as to provide traffic reporting and a performance dashboard. The reporting component 644 also includes an end-user reporting component 654, some of which functionality may be pre-defined and others of which may be provided on an ad-hoc basis. The integration component 642 may includes service adapters 648 as well as EAI adapters 646.

FIG. 12 shows an application view diagram of an embodiment of a system according to the invention. The diagram shows layers such as the client layer 710, the presentation layer 720, the web layer 730, the domain layer 740, and the persistence layer 750.

The client layer 710 includes a browser 712, which may be implemented in HTML. Serving the browser includes client-side validation component 714 and client-side caching component 716. Interacting with the browser 712 are the JSP pages 718 of the presentation layer 720. The JSP pages 718 interact with a tag library 722, UI components 724, common objects 726, and localization and internationalization functionality components 728. The presentation layer 720 and JSP pages 718 interact with the web layer 730 and more particularly with a pageflow component 732, a controller 734, request handler 736, and response handler 738. These web components interact with a request manager 742, a response manager 744, a validation component 746, a pagination component 748, a service locator 752, and a business delegate component 754. The web layer 730 and associated constituent components interact in turn with the domain layer 740. The domain layer 740 includes the business objects 756, the business services 758, the business rules 762, and the business workflow 764. These domain layer components in turn interact with a domain object factory 766, the object cursor 768, any implemented service façades 772, and an object broker 774. The domain layer 740 interacts with the persistence layer 750, which includes in particular the data access objects 776. The persistence layer 750 further includes a state manager 778, a transaction manager 782, a query manager 784, and a connection manager 786.

The remainder of the system includes components that service the above layers. These include a session manager 788, a security manager 792, an exception manager 794, and an auditing and logging component 796. Also provided are a translation manager 798, a communication manager 802, a component for alerts and notifications 804, a print manager 806, and a cache manager 808. Another set of components includes a process manager 812, a work queue manager 814, a messaging and queuing component 816, a rules engine 818, and a scheduling manager 822.

What has been described are systems and methods for designing and developing applications that are SOA-enabled. These systems eliminate the need for later-coded adapters or other interfacial tools to link the developed applications with other similarly-enabled applications.

One implementation includes one or more programmable processors and corresponding computer system components to store and execute computer instructions, such as to provide the common framework or logical architecture.

While the system has been described with respect to certain embodiments, it is clear that the scope of the invention is broader than the described embodiments. For example, while the examples above focus on software or application development, a similar approach could be applied to projects for building mechanical, electrical, or chemical systems or items as well. The systems and methods can be applied to virtually any business function, including inventory control, distribution, licensing, etc. The steps of the methods may furthermore be combined together and performed at the same or nearly the same time, especially for smaller projects. For example, where an initial set of requirements is developed, and then a detailed set, these may be combined into one set and subsequently used to create, e.g., use cases.

Accordingly, the scope of the invention is to be limited only by the claims appended hereto.

What is claimed is:

1. A non-transitory computer readable medium comprising instructions for causing a computing device to perform a method for group development of software by providing a common framework and a common set of processes to be followed by different project teams in order to facilitate unity of design and function comprising, the method comprising steps of:

receiving a plurality of development criteria into a software development framework resulting in a set of requirements defining a vision and scope of a project for a service-oriented application;

developing a process model for the service-oriented application from the set of requirements;

using the development criteria, creating a set of possible interactions between the service-oriented application and users relating to at least one particular function;

reconciling the requirements and the process model in order to ensure that the process as modeled meets the required vision and scope of the project for the service-oriented application;

deriving a set of business rules from the reconciled process model and the set of requirements;

relying on the process model, requirements and business rules, creating a technical architecture of the service-oriented application;

defining a set of services the service-oriented application will provide;

reconciling the technical architecture of the service-oriented application with the requirements and the defined services;

developing a page flow for the service-oriented application;

integrating a plurality of application layers according to the technical architecture and the page flow, resulting in an application build; and testing the assembled and integrated service-oriented application for gross errors and incompatibilities related to the assembly and integration;

wherein the method further includes developing further comprising providing an interface to develop a service façade;

wherein the method further includes developing wherein the step of providing an interface to develop at least one form and at least one display for entering and displaying data.

2. The medium of claim 1, wherein the method further includes developing a data dictionary and/or a glossary.

3. The medium of claim 1, includes providing an interface to including developing at least one FormBean™ and one ViewBean™, respectively.

4. A product, embodied on a non-transitory computer readable medium, and obtained using the method of claim 1.

* * * * *